United States Patent
Stering et al.

(10) Patent No.: US 10,776,341 B2
(45) Date of Patent: Sep. 15, 2020

(54) METHOD FOR QUALITY ASSURANCE OF FILTRATION PROCESSES

(71) Applicant: Sartorius Stedim Biotech GmbH, Goettingen (DE)

(72) Inventors: Magnus Andreas Stering, Le-Mesnil-le-Roi (FR); Kai Gloth, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 446 days.

(21) Appl. No.: 15/071,551

(22) Filed: Mar. 16, 2016

(65) Prior Publication Data
US 2016/0283542 A1 Sep. 29, 2016

(30) Foreign Application Priority Data
Mar. 25, 2015 (DE) .................. 10 2015 104 539

(51) Int. Cl.
*G06F 16/00* (2019.01)
*G06F 16/23* (2019.01)
*G06F 16/215* (2019.01)

(52) U.S. Cl.
CPC ........ *G06F 16/2365* (2019.01); *G06F 16/215* (2019.01)

(58) Field of Classification Search
CPC ......... G06F 17/30371; G06F 17/30303; G06F 16/2365; H04Q 2209/82; B06F 16/215
See application file for complete search history.

(56) References Cited

U.S. PATENT DOCUMENTS 6,666,970 B1 * 12/2003 Jornitz ................ B01D 65/102
  210/138
7,785,477 B2 * 8/2010 Oldendorf ........... B01D 35/143
  210/739

(Continued)

FOREIGN PATENT DOCUMENTS

DE  101 57 798  1/2008

OTHER PUBLICATIONS

German Search Report dated Nov. 9, 2015.
The 26th Technical Report published by the Parental Drug Association (PDA TR26)—vol. 62 No. S-5.

*Primary Examiner* — Leslie Wong
(74) *Attorney, Agent, or Firm* — Gerald E. Hespos; Michael J. Porco; Matthew T. Hespos

(57) ABSTRACT

A method for quality assurance of filtration processes includes inserting a filter element (24) into a filtration device (14*b*) in which filter elements (24) can be subjected to integrity tests. The method further includes associating the integrity information with each filter element (24) in a filter element database (16; 34) connected to a shared data network (12) and saving the number of failed integrity tests performed on each filter element (24) as integrity information associated with that filter element. The saved tolerance setting has an auxiliary limit value, which when exceeded in a defined manner by the queried number of failed integrity tests performed on the identified filter element (24), causes a warning message to be sent to a predetermined monitoring unit (20) and the resulting blocking of the selected integrity testing device (14*b*) is maintained until a release message is received from the predetermined monitoring unit (20).

6 Claims, 2 Drawing Sheets

(56) References Cited

U.S. PATENT DOCUMENTS

| | | | | |
|---|---|---|---|---|
| 8,310,379 B2* | 11/2012 | Johnson | ................. | G06Q 10/08 340/10.1 |
| 8,354,029 B2* | 1/2013 | Hank | ..................... | B01D 61/12 210/100 |
| 8,984,490 B1* | 3/2015 | Dahan | ................. | G06F 11/3006 717/127 |
| 9,636,444 B2* | 5/2017 | Burbank | ............. | A61M 1/1656 |
| 2004/0238420 A1* | 12/2004 | Oldendorf | ............ | B01D 35/143 210/91 |
| 2005/0027484 A1* | 2/2005 | Baumfalk | .......... | B01D 46/0086 702/185 |
| 2007/0168734 A1* | 7/2007 | Vasile | ................. | G06F 11/3672 714/33 |
| 2008/0015827 A1* | 1/2008 | Tryon, III | ............. | G06F 11/008 703/2 |
| 2009/0107219 A1* | 4/2009 | Douglas | ........... | G01N 35/00722 73/61.63 |
| 2009/0112654 A1* | 4/2009 | Neale | ..................... | G06Q 10/06 705/7.41 |
| 2009/0218285 A1* | 9/2009 | Hank | ..................... | B01D 61/12 210/650 |
| 2010/0191402 A1* | 7/2010 | Aldrich, III | .......... | B60W 10/30 701/33.9 |
| 2011/0043357 A1* | 2/2011 | Peatfield | ............. | A61M 5/1413 340/522 |
| 2011/0138936 A1* | 6/2011 | Collins | ................ | B01D 65/104 73/863.23 |
| 2015/0286470 A1* | 10/2015 | Dahan | ................. | G06F 11/3636 717/127 |
| 2016/0046503 A1* | 2/2016 | Hoek | ..................... | C02F 1/008 210/636 |
| 2017/0143886 A1* | 5/2017 | Wilt | ..................... | A61M 1/1668 |
| 2017/0203022 A1* | 7/2017 | Burbank | ............. | A61M 1/1668 |

\* cited by examiner

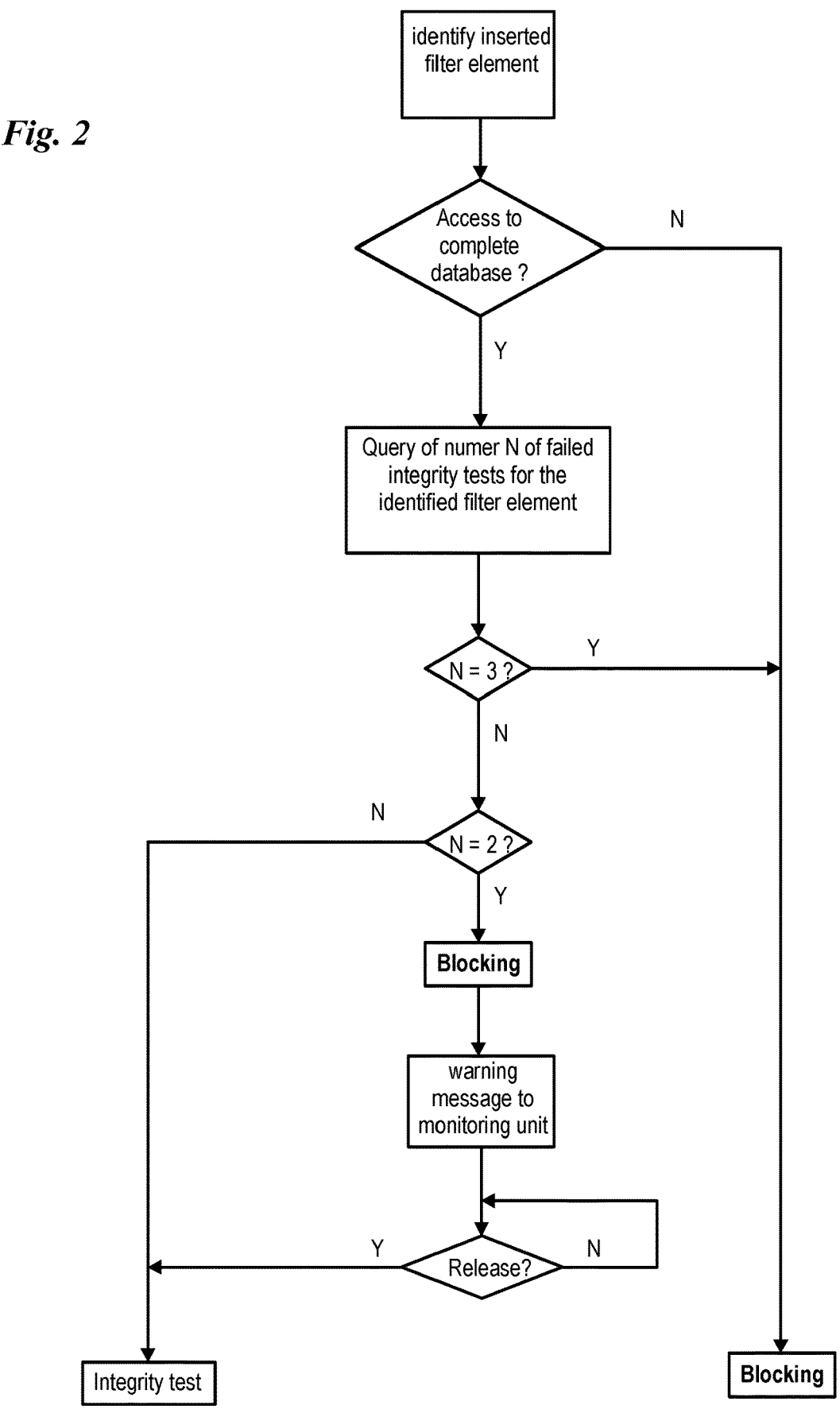

METHOD FOR QUALITY ASSURANCE OF FILTRATION PROCESSES

BACKGROUND

1. Field of the Invention

The invention relates to a method for quality assurance of filtration processes.

2. Description of the Related Art

US 2005/0027484 A1 discloses a method for quality assurance of filtration processes that includes the steps of: inserting a filter element into a filtration device that is selected from among a plurality of filtration devices connected to a shared data network, of which at least some are designed as integrity testing devices in which filter elements are subjected to integrity tests to assess their functional integrity, identifying the inserted filter element, querying integrity information associated with the identified filter element, comparing the queried integrity information with a saved tolerance setting and blocking the selected filtration device if the queried integrity information does not conform to the saved tolerance setting.

The 26th Technical Report published by the Parenteral Drug Association (PDA TR 26, for short) describes in detail the individual steps to be performed in order to assess the integrity of a filter element. In particular, the document describes processes that are to be complied with if a filter element does not pass an integrity test performed on it in a corresponding integrity testing device. For instance, according to PDA TR 26, it is permissible to repeat the integrity test a predefined number of times, in which case the individual integrity tests that are not passed must be documented in order to ensure that a filter element is definitively rejected as unsuitable after failing to pass a predefined maximum number of integrity tests. In practice, PDA TR 26 is implemented on the basis of work instructions given in companies that perform filtration tasks, such as in the biochemical and food industries. Since they are carried out by human staff, however, such work instructions are prone to error and manipulation. This poses significant documentation problems for manufacturers and suppliers when filtration problems occur at a customer's company and it must be clarified whether this is due to defects (for which the manufacturer is responsible) of the filtration system or due to use of filter elements that were improperly tested (by the customer).

DE 101 57 798 B4 discloses a method for performing filtration processes using networked filtration devices. Filter elements inserted into such filtration devices are identified based on machine-readable data carriers (barcode, QR code, transponder, etc.) attached to them, and their identity is communicated to a central filter element database connected to the shared data network. This central filter element database contains filter-element-specific data, in particular, integrity data and product release data, but also specific process and tolerance data. Information can be fed into the filter element database from external sources as well as from the connected filtration devices. Before performing a specific filtration task, the respective filtration device accesses the filter-element-specific data from the filter element database, and is thus able to assess whether the inserted, identified filter element is approved and suitable for the intended purpose. If this is not the case, the filtration device is blocked, at least for the current combination of filter element and filtration task. This process runs automatically and on a software basis, and the corresponding control is executed by means of a process control unit that is also connected to the shared data network. With regard to the known method, it is disadvantageous that the integrity information in the filter element database is not itself subject to any monitoring.

The aforementioned, generic document discloses the practice, before using the filter element, of wirelessly reading the data pertaining to this filter element, which data are saved in a transponder memory attached to the filter element itself. As data pertaining to the filter element, the document lists identification data, limit values for measurement data, measured test values, i.e. a certain type of integrity data, as well as so-called limiting data, such as service life and permitted number of regeneration and sterilization cycles. Such a quality assurance method appears to be more reliable than having human staff execute work instructions. But in complicated borderline cases, such as in the event of unclear integrity test results, the system reveals itself to be too rigid and—depending on the presettings—can result in significant rejection rates or reduced quality assurance.

The invention seeks to solve the problem of providing a more efficient design of the generic quality assurance method, without compromising reliability.

SUMMARY

Terms used in the following description are consistent with terms used in this technology and consistent with the terms used and defined in the above-referenced PDA TR 26 publication. in particular, as defined in PDA TR 26, the term filter is understood to mean a device used to remove particles from a fluid process stream and comprises a porous medium. A filtration process is a process by which particles are removed from a fluid by passing the fluid through a porous medium. An integrity test is understood to be a nondestructive physical test that can be correlated to the capability of a filter or filter assembly to retain bacteria or other particles removed from the fluid passing through the filter. The invention relates to a method for quality assurance of filtration processes that includes the steps of: inserting a filter element into a filtration device that is selected from among a plurality of filtration devices connected to a shared data network, of which at least some are designed as integrity testing devices in which filter elements are subjected to integrity tests to assess their functional integrity, identifying the inserted filter element, querying integrity information associated with the identified filter element, comparing the queried integrity information with a saved tolerance setting and blocking the selected filtration device if the queried integrity information does not conform to the saved tolerance setting. Additionally, the method provides that the integrity information is associated with each filter element in a filter element database connected to the shared data network and the number of failed integrity tests performed on each filter element is saved as integrity information associated with that filter element. The saved tolerance setting comprises a first limit value which, if exceeded in a defined manner by the queried number of failed integrity tests performed on the identified filter element, causes a warning message to be sent to a predefined monitoring unit and the resulting blocking of the selected integrity testing device is maintained until a release message is received from the predetermined monitoring unit.

The method initially follows the familiar concept of extending the application of the quality assurance system to include integrity testing devices for filter elements. Instead of or in addition to filtration devices that perform productive filtration processes, those filtration devices should (also) be integrated into the overall network that exclusively serve to perform integrity tests to assess the functional integrity of filter elements or cooperate in their performance.

The method according to the invention works according to the following principle: first a filter element that is to be tested is inserted into a selected integrity testing device. The selected integrity testing device is connected, along with a plurality of other integrity testing devices, to a shared data network. This can be an intranet or the internet, for example. The filter element is identified during or after insertion, for which purpose typically a reader integrated into the integrity testing device interacts with a machine-readable marking on the filter element, such as a barcode, QR code, transponder or similar.

Specific integrity information for the identified filter element is then queried from a filter element database, which is also connected to the shared data network. The term "query" of integrity information should be understood in a broad sense here and includes not only the requesting and sending of saved data, but also the outcome that there are not yet any entries in the filter element database for the specific filter element. In particular, this includes the integrity information. i.e. that the said filter element has not yet had any integrity tests performed on it. The concept of the filter element database and, in particular, the various variations in its realization, are described in detail below.

As a next step, the queried integrity information is compared to a saved tolerance setting. According to the invention, it is provided that a tolerance comparison is performed, in particular, on the number of integrity tests performed on the filter element and which the filter element has failed. The tolerance values to be applied in this case are, in particular, the maximum number of failed integrity tests that an individual filter element, e.g. in compliance with PDA TR 26, may undergo before it is subject to special treatment or definitive rejection.

In this regard, the saved tolerance values can be configured differently, depending on the quality assurance protocol being executed. Typically, it is provided that the saved tolerance setting comprises an absolute limit value which, if exceeded in a defined manner by the queried number of failed integrity tests performed on the identified filter element, results in the blocking of the selected integrity testing device being maintained at least until removal of the identified filter element from the selected integrity testing device. In other words, in this embodiment, the integrity testing device in question is blocked until the filter element in question is removed. The filter element in question then is regarded as having been essentially definitively rejected. Preferably a corresponding entry is made in the filter element database at the same time, and such an entry also preferably is made in a writable memory element of the filter element itself (e.g. a transponder) so as to exclude any future use.

In any case, it is provided according to the invention that the saved tolerance setting comprises an auxiliary limit value which, if exceeded in a defined manner by the queried number of failed integrity tests performed on the identified filter element, triggers the sending of a warning message to a predetermined monitoring unit and the resulting blocking of the selected integrity testing device is maintained until a release message is received from the predetermined monitoring unit. This is still not equivalent to definitive rejection of the filter element in question; rather, notification is sent to a monitoring unit, which can be a machine unit or a human unit. This unit can then perform only the examinations and assessments reserved for it and not those reserved for the direct operator of the integrity testing device, and this can, in certain cases, lead to the result that another integrity test, potentially under modified test conditions, is allowed. The integrity testing device in question is released only after receipt of a corresponding release message. The receipt of the release message then enables the additional integrity test to be performed.

The concept of the "limit value being exceeded in a defined manner" is to be understood broadly here. A person skilled in the art will recognize that it is irrelevant whether a limit value x exceeded by y or the attainment of a limit value x+y is algorithmically programmed. These and substantially functionally identical alternatives should all be covered by the chosen concept.

Both of the above variants can be used together. For example, a lower limit value, e.g. two failed integrity tests, can trigger the involvement of the monitoring unit, whereas the exceeding of a higher limit value, e.g., three failed integrity tests, results in definitive rejection of the filter element.

If it is determined during such a tolerance comparison that the filter element in question has already exhausted the "permitted" number of failed integrity tests, the integrity testing device in question is blocked at least temporarily. In other words, it is at least temporarily impossible to perform any additional integrity tests using that integrity testing device. In particular, the currently impending integrity test of the filter element in question is prevented. On the other hand, if it is determined that the filter element in question has not yet exhausted the permissible maximum number of failed integrity tests, an additional integrity test can be performed. As is logical and preferred within the scope of the present invention, the result of this test then is communicated to the filter element database, in which the integrity information associated with the filter element in question is updated accordingly. In particular, it is preferable to provide that after each failed integrity test that is performed in an integrity testing device, the number of failed integrity tests saved as integrity information associated with the respectively affected filter element is increased by one. In simplified terms, a "counter" in the filter element database increases by one for every failed integrity test.

Every integrity testing device can access the filter element database, by virtue of being connected to the shared data network, in order to query the necessary integrity information. However, to ensure that no filter element can be subjected excessively often to further integrity tests (until the "right" results are obtained) in an integrity testing device that is uncoupled from the shared data network without being in communication with the filter element database, a preferred further development of the invention provides that the selected integrity test device be blocked if access to the complete filter element database cannot be achieved during the step of querying the integrity information. This means that preferably, communication with the complete filter element database is treated as a necessary prerequisite for performance of an integrity test.

Depending on the design of the filter element database, this can have various effects. In a case that is regarded as particularly favorable, it is provided that the filter element database be designed as a central database. In this case, it must only be ensured that on the one hand, the central database and, on the other hand, the selected integrity testing device, are connected to the shared data network. This version can be referred to as a "cloud" version. Alternatively, it can also be provided that the filter element database be designed as a decentralized database comprising multiple segments, each of which is saved in one of the integrity testing devices, and the number of failed integrity tests performed with the respective integrity testing device is saved in each segment, specifying the individual filter element. For example, it can be provided that every integrity testing device only saves that integrity information that is associated with the filter elements tested in it. In this case, the query of the integrity information requires a poll of all integrity testing devices connected to the shared data network to ensure that the filter element in question has not already reached the permitted number of integrity tests on other integrity testing devices. This version can be referred to as a "peer-to-peer" version. In order to take account of the aforementioned requirement for access to the complete filter element database, it is a consequence of this variant that if one of the integrity testing devices that is connected as intended to the shared data network is "offline," none of the "online" integrity testing devices can be used to perform an integrity test. Of course, hybrid designs of both versions are conceivable.

Additional features and advantages of the invention derive from the following specific description and drawings.

BRIEF DESCRIPTION OF THE DRAWINGS

FIG. 2 shows a flow diagram of an embodiment of the method according to the invention.

DETAILED DESCRIPTION

Figure 1:
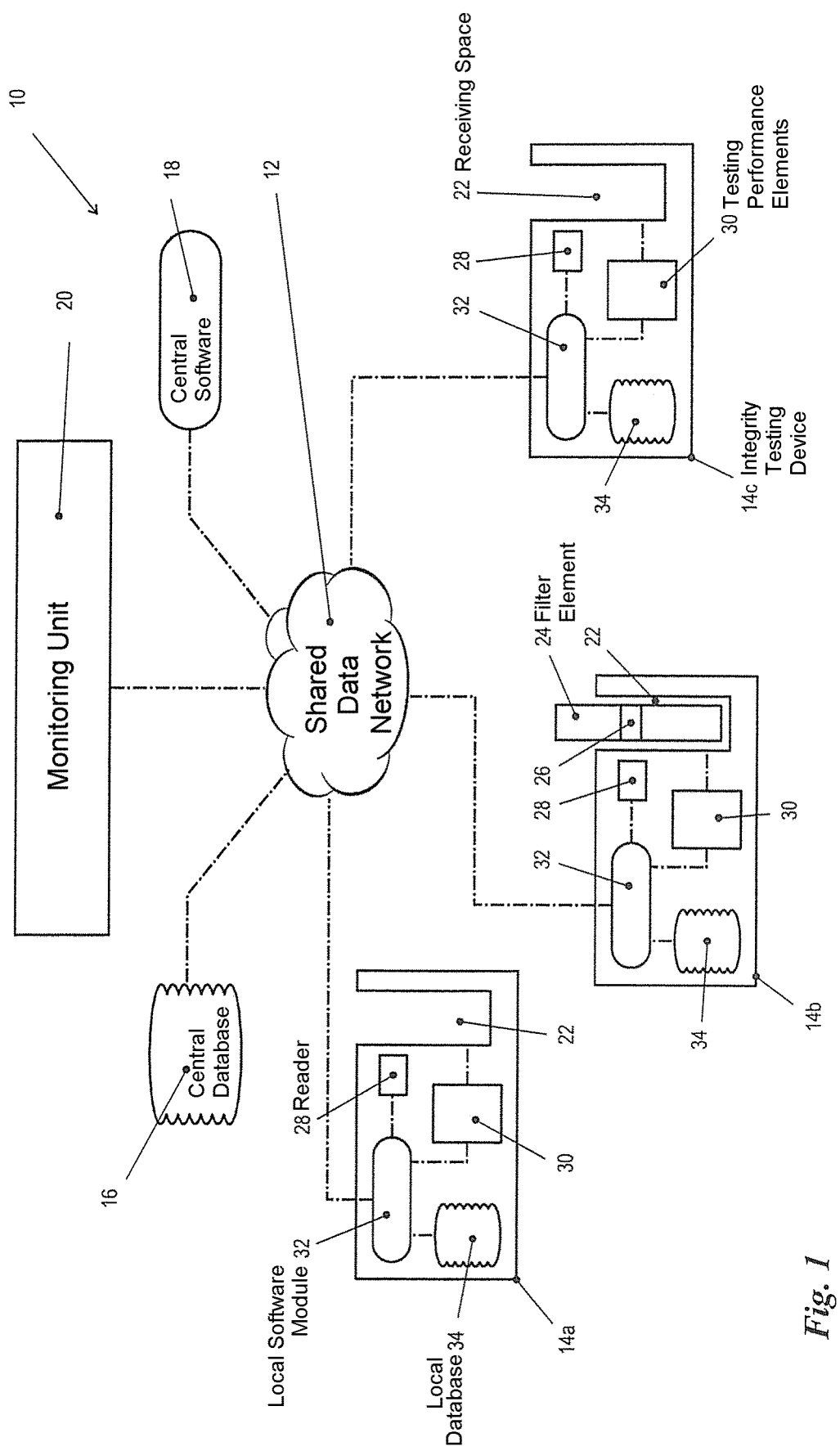
FIG. 1 is a schematic representation of the structure of a network for executing the method according to the invention.

FIG. 1 shows a highly schematic view of the possible structure of a network 10 for executing the quality assurance process according to the invention, for which the flow diagram for a possible embodiment shown in FIG. 2 is provided purely as an example.

A plurality (three, in FIG. 1) of integrity testing devices 14a, 14b, 14c is connected to a shared data network 12. In this context, "connected" means a data and/or control connection, with corresponding data and/or control paths being indicated in FIG. 1 by means of dashed lines. The connection of the integrity testing devices 14a,14b,14c is a compulsory requirement for the present invention. On the other hand, the other elements shown in FIG. 1 as also being connected to the shared data network 12 are optional and are described below. On one hand, there is a central database 16, which houses, in particular, the filter element database according to the invention, i.e. in which filter-element-specific integrity information, in particular, is saved. FIG. 1 also shows a central software 18 used to execute the method according to the invention on the individual integrity testing devices 14a, b, c in a centrally-controlled manner. Finally, FIG. 1 also shows a monitoring unit connected to the shared data network 12, the details of which are not described further. This can be a mechanical or human monitoring unit.

Each of the integrity testing devices 14a, b, c has a receiving space 22 for a filter element 24, which is shown in FIG. 1 as being inserted into the middle integrity testing device 4b, while the receiving spaces 22 of the other integrity testing devices 14a, c in FIG. 1 are empty. A person skilled in the art will understand that the filter element 24 shown is representative of any arbitrary filter element that can be tested in any of the integrity testing devices 14a, b, c.

In the embodiment shown, the filter element 24 has a machine-readable marking 26 that can be read by a corresponding reader 28 in the integrity testing devices 14a,b,c to identify the filter element 24. For example, the machine-readable data unit 26 can be a barcode, QR code, a transponder or similar; the reader 28 is a corresponding reader in each case.

Each integrity testing device 14a, b, c further comprises elements for actual performance of an integrity test. In FIG. 1, these test performance elements 30 are shown in simplified form as boxes. The test performance elements 30 are operated by means of software control; the central software 18, to the extent present, can be used for this purpose. However, it is also conceivable to use software modules 32 installed in the individual integrity testing devices 14a, b, c. In FIG. 1, both the local software modules 32 and a central software 18 are shown; a person skilled in the art will understand that these can replace and/or supplement one another wholly or in part. In the shown embodiment, the local software modules 32 also serve, in particular, as software interfaces for data communication with the shared data network 12.

Finally, with regard to the embodiment in FIG. 1, a local database 34 capable of storing segments of the filter element database is provided in each integrity testing device 14a, b, c. A person skilled in the art will understand that the central database 16 and the local databases 34 shown in FIG. 1 can replace or supplement one another in whole or in part, depending on the embodiment. For instance, embodiments are conceivable in which only local databases 34 are used. Embodiments are equally conceivable in which a central database 16 is used exclusively. Finally, hybrid embodiments are conceivable in which, for example, the content of a local database 34 is moved into the central database 16 when the corresponding integrity testing device is removed from the shared data network 12. This is done to ensure that the remaining integrity testing devices can access the content of their local database 34, even if one of them is disconnected. This is important for the reliable execution of the method according to the invention, for which an exemplary embodiment is shown in the flow diagram in FIG. 2, which is described below.

The depiction in FIG. 2 assumes that a filter element 24 has been inserted into the receiving space 22 of any integrity testing device 14b, in order to subject this filter element 24 to an integrity test. In a first procedural step, the filter element 24 is identified. This preferably is done by means of interaction between the machine-readable data unit 26 and the reader 28. Then it is checked whether the integrity testing device 14b has access to the complete filter element database. In cases in which only a central database 16 is provided, this simply involves enabling access to this central database 16. In cases in which parts of the filter element database are alternatively or additionally stored in local databases of the remaining integrity testing devices 14a, 14c, access to these local databases 34 must be additionally ensured. If this is not the case, because for example, the integrity testing device 14b in question, one of the remaining integrity testing devices 14a, 14c and/or the central database 16 is not connected to the shared data network 12, the integrity testing device 14b is blocked such that the intended integrity test cannot be performed. The reason for the blocking action is that, without access to the complete filter element database, it cannot be ensured that all the integrity test information that is relevant for the identified filter element 24 can be considered. Of course, for such a query, it is important that it be possible to determine whether those database components that can be accessed actually represent the complete database. However, to this end, several data management systems are known to a person skilled in the art.

If access to the complete filter element database is confirmed, the next procedural step is to query the number N of previously failed integrity tests for the identified filter element 24. This number is saved as essential integrity information in the filter element database.

In a next step, the queried number N is compared to an absolute limit value. In the cited exemplary embodiment, the limit value is three. If the filter element has already been subjected to, and failed, three integrity tests, the integrity testing device 14b is blocked immediately in the shown embodiment. This would also occur in each of the other integrity testing devices 14a, 14c and at all future times. In other words, within the scope of the system according to the invention, it is no longer possible to again test the integrity of the identified filter element 24, which excludes the possibility that this filter element 24 can be assigned an "OK" status and be used in any filtration processes. The filter element 24 is thus de facto definitively rejected.

If, however, the number of failed integrity tests saved for the filter element 24 in the filter element database is not equivalent to three, this necessarily means, first, that fewer than three unsuccessful integrity tests have been performed. Therefore, in a next procedural step it is checked whether the number N corresponds to an auxiliary limit value, namely two in the shown exemplary embodiment. If this is not the case, i.e. if the filter element does not have any or at most, one, failed integrity test in its past, an (other) integrity test is performed. The result of this is saved in the filter element database. In particular, the number N is increased by one in the event that an (other) integrity test is failed.

If the number of failed integrity tests is already at two, the integrity testing devices 14b are temporarily blocked, however this does not yet mean that the filter element 24 is definitively rejected. Rather, in this case, a warning message is sent to the monitoring unit 20, where the specific individual case of the filter element 24 is evaluated according to predefined criteria, either automatically or individually by means of human review. If this evaluation concludes that it is reasonable to perform another integrity test, potentially subject to special conditions, the monitoring unit sends a release message to the integrity testing device 14b, which can then perform another integrity test (with the previously described consequences for the filter element database). Otherwise, the release message continues to be waited for and the integrity testing device 14b remains blocked.

To avoid unnecessary complication, FIG. 2 does not show separately that the blocking of the integrity testing device 14b preferably is cancelled automatically once filter element 24 is removed from the receiving space 22.

Of course, the embodiments discussed in the specific description and shown in the Figures are only illustrative exemplary embodiments of the present invention. The present disclosure gives a person skilled in the art a broad spectrum of possible variations to work with. In particular, a person skilled in the art is completely free to choose the limit values, the specific query algorithms and other settings for the performance of the integrity tests.

LIST OF REFERENCE NUMBERS

10 Quality assurance network
12 Shared data network
14a, b, c Integrity testing device
16 Central database
18 Central software
20 Monitoring unit
22 Receiving space
24 Filter element
26 Machine-readable data unit
28 Reader
30 Test performance elements
32 Local software module
34 Local database

What is claimed is:

1. A method for quality assurance of filtration processes, comprising the steps:
   inserting a filter element (24) into a filtration device (14b) selected from among a plurality of filtration devices (14a, 14b, 14c) connected to a shared data network (12), of which at least some are designed as integrity testing devices (14a, 14b, 14c), in which filter elements (24) can be subjected to integrity tests to assess their functional integrity;
   identifying the inserted filter element (24);
   querying integrity information associated with the identified filter element (24), said integrity information being associated with each filter element (24) in a filter element database (16; 34) connected to the shared network (12) and representing a number of failed integrity tests performed on each filter element (24);
   comparing the queried integrity information with saved tolerance settings that comprise an auxiliary limit value of failed integrity tests for the respective filter element (24) and an absolute limit value of failed integrity tests for the respective filter element (24), wherein the absolute limit value is greater than the auxiliary limit value;
   blocking the selected filtration device (14b) if the queried integrity information exceeds the auxiliary limit value;
   sending a warning message to a predetermined monitoring unit to indicate that the queried integrity information exceeds the auxiliary limit value; and
   releasing the blocking upon receipt of a release message from the predetermined monitoring unit if the queried integrity information that exceeds the auxiliary limit value is less than the absolute limit value.

2. The method according to claim 1, wherein
   if the queried number of failed integrity tests performed on the identified filter element (24) exceeds the absolute limit value, the method then causes the blocking of the selected integrity testing device (14b) to be maintained at least until the identified filter element (24) is removed from the selected integrity testing device (14b).

3. The method of claim 2, wherein
   the filter element database is a central database (16).

4. The method of claim 2, wherein
   the filter element database is a decentralized database comprising multiple segments (34) that are each saved in one of the integrity testing devices (14a, 14b, 14c), wherein in each segment (34) the number of failed integrity tests performed using the respective integrity testing device (14a, 14b, 14c) is saved in a filter-element-related manner.

5. The method of claim 1, wherein
   the selected integrity testing device (14b) is blocked in the event that it does not obtain access to the complete filter element database (16, 34) during the step of querying the integrity information.

6. The method according of claim 1, wherein
after every failed integrity test performed in one of the integrity testing devices (14 *a, b, c*), the number of failed integrity tests saved as the integrity information associated with the respectively affected filter element (24) is increased by one.

\* \* \* \* \*